US 6,713,907 B2

(12) United States Patent
Matsumoto

(10) Patent No.: US 6,713,907 B2
(45) Date of Patent: Mar. 30, 2004

(54) BLOWER FOR USE IN OFFICE AUTOMATION EQUIPMENT

(75) Inventor: Kaoru Matsumoto, Miyota-machi (JP)

(73) Assignee: Minebea Co., Ltd., Kitasuka-gun (JP)

( * ) Notice: Subject to any disclaimer, the term of this patent is extended or adjusted under 35 U.S.C. 154(b) by 0 days.

(21) Appl. No.: 09/863,442

(22) Filed: May 24, 2001

(65) Prior Publication Data
US 2002/0024264 A1 Feb. 28, 2002

(30) Foreign Application Priority Data
Jun. 21, 2000 (JP) ........................................ 2000-186244

(51) Int. Cl.[7] ............................. H02K 11/00; H02K 7/00
(52) U.S. Cl. ........................ 310/67 R; 310/90; 310/89; 310/254
(58) Field of Search ............................. 310/67 R, 254, 310/90, 89, 68 R, 88, DIG. 6, 85, 91

(56) References Cited

U.S. PATENT DOCUMENTS

| | | | | |
|---|---|---|---|---|
| 4,554,491 A | * | 11/1985 | Plunkett | 318/254 |
| 4,682,065 A | * | 7/1987 | English et al. | 310/90 |
| 4,728,833 A | * | 3/1988 | Shiraki et al. | 310/68 R |
| 4,757,222 A | * | 7/1988 | Shiraki et al. | 310/68 B |
| 4,861,237 A | * | 8/1989 | Shiraki et al. | 417/353 |
| 4,891,537 A | * | 1/1990 | Shiraki et al. | 310/68 B |
| 5,663,604 A | * | 9/1997 | Takahashi | 310/91 |
| 5,925,948 A | * | 7/1999 | Matsumoto | 310/67 R |
| 5,973,428 A | * | 10/1999 | Zakrocki et al. | 310/71 |
| 6,023,117 A | * | 2/2000 | Chen | 310/91 |
| 6,031,306 A | * | 2/2000 | Permuy | 310/67 R |
| 6,136,250 A | * | 10/2000 | Brown | 264/272.2 |
| 6,309,191 B1 | * | 10/2001 | Hu | 417/423.12 |
| 6,509,666 B1 | * | 1/2003 | Huang et al. | 310/254 |
| 6,572,346 B2 | * | 6/2003 | Hsieh | 417/354 |
| 2001/0048254 A1 | * | 12/2001 | Engel et al. | 310/68 B |
| 2002/0117909 A1 | * | 8/2002 | Gomyo | 310/67 R |
| 2002/0185931 A1 | * | 12/2002 | Lee | 310/254 |
| 2003/0117029 A1 | * | 6/2003 | Horng et al. | 310/89 |

OTHER PUBLICATIONS

Merriam–Webster's Collegiate Dictionary, 10th edition, Merriam–Webster Inc., 1998. p. 127.

* cited by examiner

Primary Examiner—Dang Le
Assistant Examiner—Heba Elkassabgi
(74) Attorney, Agent, or Firm—Oliff & Berridge PLC

(57) ABSTRACT

A blower prevents deterioration of an electronic circuit caused by installation in a dusty and/or moisty environment or by an increased temperature due to self-generated heat of a fan so as to provide an increased ventilation capacity. The blower comprises a motor yoke which has impellers at an outer periphery thereof and a permanent magnet at an inner periphery thereof and is rotatably mounted on a shaft, and a stator core which is provided with a stator wire wound around and disposed inside of the permanent magnet. A case portion that is disposed close to the stator wire and the stator core houses therein a circuit board mounting an electronic circuit (components). The case portion is formed of a highly heat releasing material and/or provided with cooling fins at an outer peripheral wall thereof for an additional heat release effect, thereby preventing deterioration of the electronic circuit and/or increasing a capacity of power supplied to the stator coil.

2 Claims, 4 Drawing Sheets

BLOWER FOR USE IN OFFICE AUTOMATION EQUIPMENT

BACKGROUND OF THE INVENTION

1. Field of the Invention

The present invention relates to an improvement of a blower for use in a variety of office automation equipments (hereinafter referred to as OA equipment)

2. Description of Related Art

An OA equipment such as a computer or a copying machine, etc. houses electronic circuits (a multiplicity of electronic parts) in its housing, which generates a considerable amount of heat causing a damage or a deterioration of the electronic parts because the heat is not easily released from the housing.

In particular, such OA equipment in recent years is in a downsizing trend providing a smaller size of housing while the amount of heat generated is approximately same, so that it will be more important technical task to deal with a heat-related problem. Accordingly, there has been provided a blower at a ventilation hole on a sidewall of the housing through which the heat internally generated is released out of the housing so as to prevent the electronic components from being thermally damaged.

A conventional blower of this type is hereinbelow described with reference to FIG. 3.

Reference numeral 1 in FIG. 3 denotes a casing approximately a cylindrical shape. A housing 2 is integrally formed at the center of the casing 1 and a cylindrical bearing support 3 is fitted and inserted in the center portion of the housing 2.

The bearing support 3 supports outer races of two bearings 4, 5 disposed at an interval while a shaft 6 is supported by inner races of the bearings 4, 5. A stop ring 7 is wore at a lower end of the shaft 6 which prevents the shaft 6 from being pulled out and positions the shaft 6 in the axial direction.

A reference numeral 8 denotes an impeller made of synthetic resin and consists of a cylindrical body 9 and blades 10 disposed on outer periphery of the cylindrical body 9. The impeller 8 is mounted in such a manner that the body 9 is fitted and inserted into a cup-shaped motor yoke 11.

The motor yoke 11 is connected to the top end of the shaft 6 through a zinc die-cast-made boss 12. The shaft 6 has a knurling groove 13 thereon at its connecting portion with the boss 12 to improve a tight-fitting with the boss 12. A ring-shaped permanent magnet 14 is fixed at an inner periphery of the motor yoke 11.

A stator core 16 having a stator wire 15 wound around is fixed at an outside of the bearing support 3. A circuit board mounting an electronic circuit, e.g. a PC board 17, is mounted below the stator core 16 (at a static part) so as to supply a predetermined electric current to the stator wire 15 in order to activate a unit of the stator wire 15 on the stator core 16, and a unit of the motor yoke 11 and the permanent magnet 14 to work respectively as stator and rotor for a brushless direct current motor.

The electronic circuit mounted on the PC board 17 controls an electric current supplying to the stator wire 15 in order to rotate the unit of the motor yoke 11 and the permanent magnet 14 relative to the unit of the stator wire 15 and the stator core 16. The stator wire 15 is connected to the electronic circuit on the PC board 17 through a conductive wire, not shown. Moreover, a lead wire 18 is connected to the PC board 17 so that power is supplied to the PC board 17 therethrough.

The blower thus constructed is used by mounting at a ventilation hole of a housing (not shown) of an OA equipment. The blower is normally mounted at the ventilation hole in such a manner that the upper side in the drawing faces the exterior of the housing while directing the shaft 6 to be horizontal.

When a direct current of a predetermined voltage is supplied to the lead wire 18, a current controlled by the electronic circuit on the PC board 17 flows to the stator wire 15. Then a magnetic flux is generated from the stator core 16, which rotates the motor yoke 11 and the impeller 8 at the center of the shaft 6 by mutually reacting with the magnetic flux generated from the permanent magnet 14.

As a result, air within the housing at the lower side of the drawing is sucked and releases toward the upper direction of the drawing through a air cavity 19, namely toward the outside of the housing. The interior of the housing is cooled by this ventilating performance.

As typically shown in FIG. 3, a conventional blower provides the PC board 17 disposed below the stator wire 15 and the stator core 16 without any consideration thereto such that the PC board 17 is nakedly exposed to the atmosphere. Thus, the PC board 17 is vulnerable to adverse effects of the stator wire 15 closely facing to the board and to the installation environment of the housing on which the blower is mounted.

Accordingly, over a long time use of the blower, the stator wire 15 may come into contact with the PC board 17 causing a short circuit, or a heat directly released from the stator wire 15 may deteriorate the characteristics of the electronic circuit (component 20) or insulation properties of the PC board 17.

If the blower is used in a dusty and/or a moisty environment, dust and moisture may directly settle onto the PC board 17 leading to the deterioration of the electronic circuit (components 20) or short circuit. The electronic circuit (components 20) on the PC board 17 is especially vulnerable to the dust and moisture causing an extensive reduction of insulation properties of the components. Any solution or improvement has been long waited in light of such drawback.

Furthermore, although cooling the interior of the housing, the blower itself generates heat. However, the conventional blower does not take into account the radiation effect of such self-generated heat, and therefore the heat gradually accumulates in the electronic circuit (components 20) of the PC board, which deteriorates the function thereof.

SUMMARY OF THE INVENTION

The present invention has been made in light of such drawbacks described above, and an object thereof is to provide a blower being able to prevent deterioration of the electronic control circuit (components) due to a close disposition of a stator wire.

It is another object of the present invention to provide a blower in which the deterioration of the electronic control circuit, particularly a reduction of an insulation property, due to a close disposition to the stator wire or to an installation environment is properly prevented.

It is still another object of the present invention to provide a blower, in which an increase of temperature generated by the blower itself due to an accumulated heat are prevented as much as possible in order to maintain the electronic circuit function.

To achieve the above described objects, a blower according to a first aspect of the present invention comprises a bearing disposed at the center of an approximately cylindrical casing, a shaft supported by the bearing, a motor yoke mounted on the shaft while having an impeller on an outer periphery and a permanent magnet on an inner periphery thereof, a stator core having a stator wire wound around disposed at the inner side of the permanent magnet, and a circuit board mounting an electronic circuit for supplying a predetermined amount of electric current to the stator wire which closely disposed to the stator wire and the stator core, wherein a partition plate is interposed between the stator core having the stator wire and the circuit board.

A blower according to a second aspect of the present invention comprises a similar feature of the first aspect, wherein a case portion is formed close to the stator wire and the stator core, and a circuit board is stored within the case portion.

A blower according to a third aspect of the present invention, in the second aspect comprises a motor base integrally formed with the casing, a lid member integrally formed with a bearing support member connected to the motor base in such a manner as to cover the motor base, and at least the lid member being formed of excellent thermal conductive material.

A blower according to a fourth aspect of the present invention, in the aspect 2 or 3 comprises a feature, wherein a case portion is provided with cooling fins disposed at the outer peripheral wall thereof.

An invention according to a first aspect of the present invention provides a blower which prevents a stator wire from contacting with a circuit board by a partition plate even if the stator wire is partially unwound to the circuit board over a long time usage. And, a heat generated from the stator wire is insulated with the partition plate so as to prevent the heat from directly radiating to the circuit board.

An invention according to a second aspect of the present invention provides the blower which houses the circuit board within a case portion so as to not only take the advantageous effects of the first aspect but also prevent deterioration due to an installation environment. That is, the circuit board is well protected even in a dusty and/or a moisty environment with the case portion, thereby prohibiting the dust and moisture from directly settling onto the circuit board (components) while keeping the circuit board free from deterioration or short circuit.

An invention according to a third aspect of the present invention in the aspect 2 provides the blower, wherein part of the case portion is integrally formed with a bearing support supporting a shaft. And, at least such integrally formed portion is made of a material of excellent thermal conductivity so that an increase of temperature of the blower due to a self-generating heat is minimized.

An invention according to a third aspect of the present invention in the aspect 2 or 3 provides the blower, wherein cooling fins are provided at the outer peripheral wall of the case portion so as to attain an improved effect of a heat release.

DETAILED DESCRIPTION OF PREFERRED EMBODIMENTS

Preferred embodiments of the present invention will now be described with reference to the accompanying drawings.

Figure 1A:
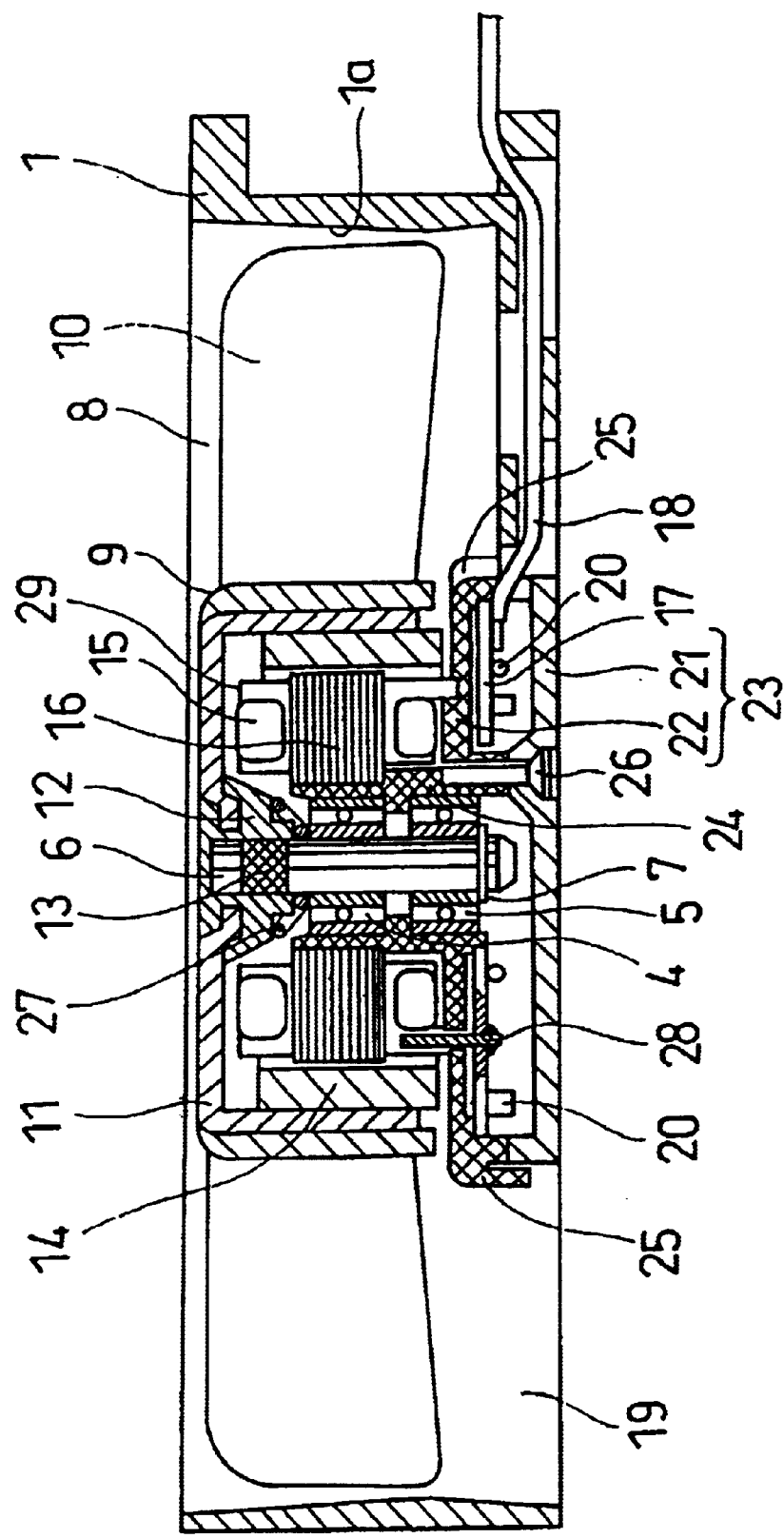
FIG. 1A is a longitudinal cross-section view of a blower according to one embodiment of the present invention.
Figure 2:
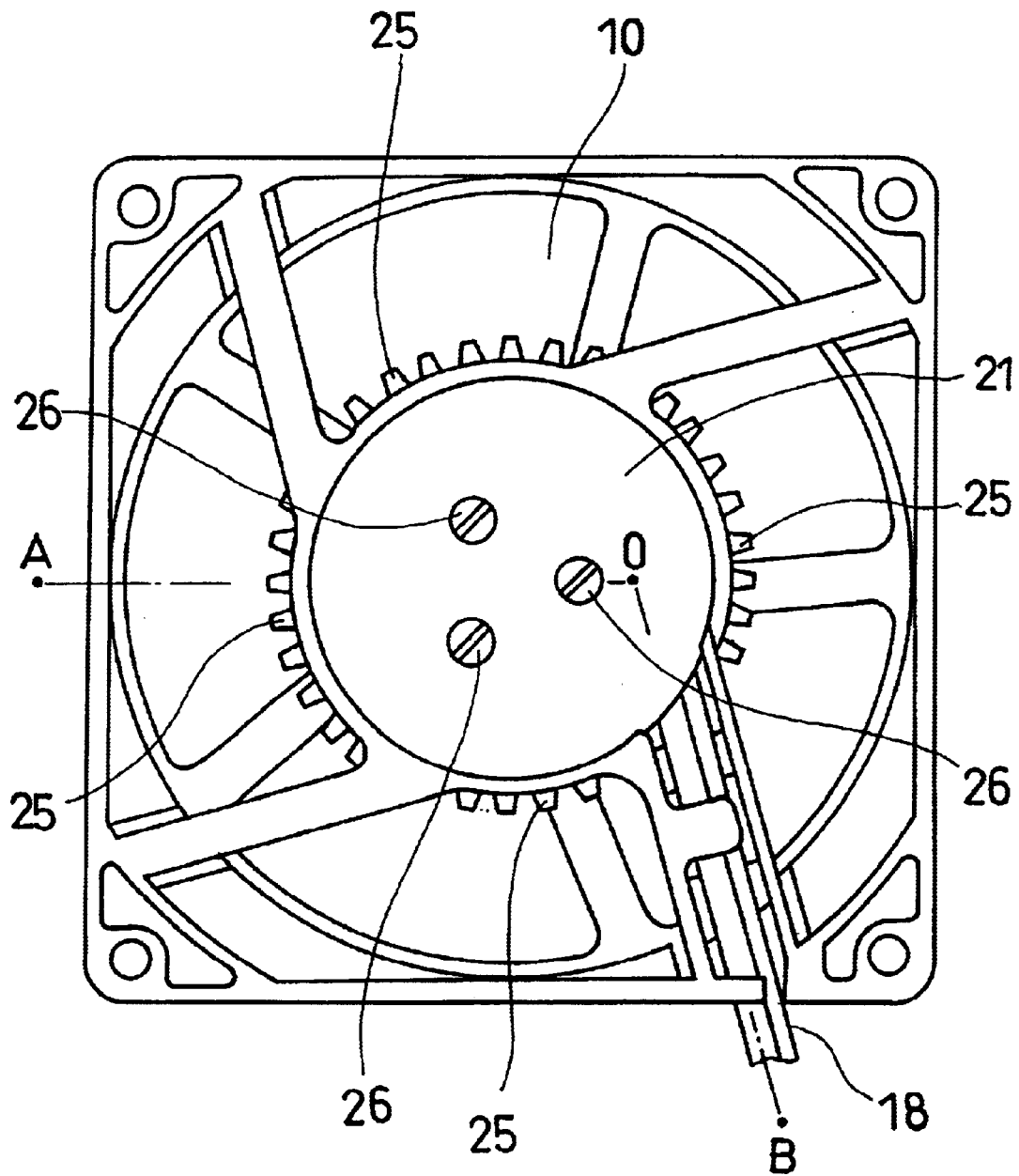
FIG. 2 is a bottom view of the blower shown in FIGS. 1A and 1B.
Figure 3:
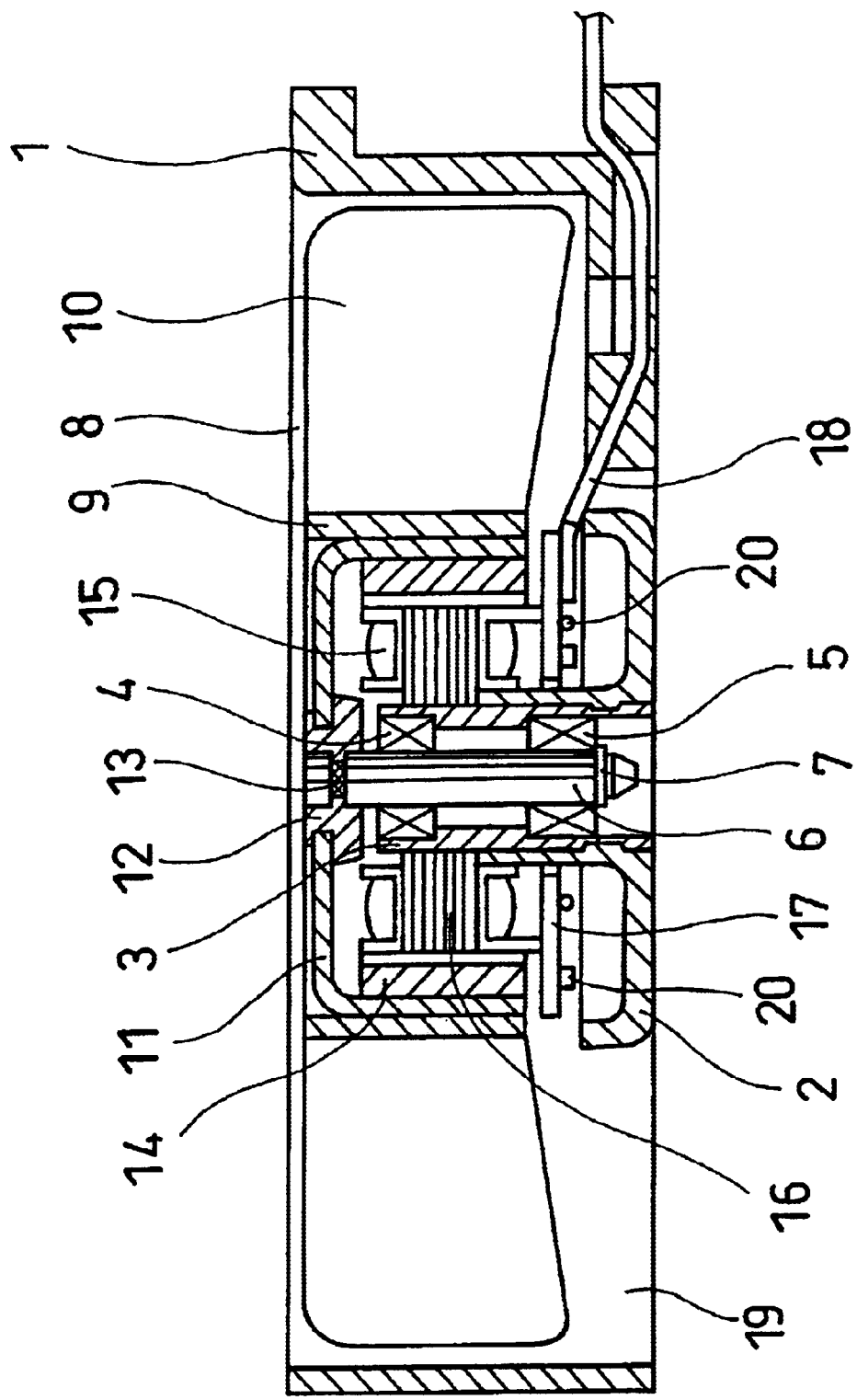
FIG. 3 is a longitudinal cross-sectional view of a conventional blower.

FIG. 1A is a longitudinal cross-sectional view of an embodiment of a blower according to the present invention, and FIG. 2 is a bottom view of the blower shown in FIG. 1A. FIG. 1A is a linearly developed cross-sectional view taken from lines A–O–B in FIG. 2.

In both drawings, a reference numeral 1 denotes an approximately cylindrical casing made of synthetic resin, which has a venturi portion 1a along its inner periphery. A motor base 21 integrally formed at the center portion of the casing forms a case portion 23 with a lid member 22 (partition plate) covering an upper portion of the case portion 23 in the drawing.

A cylindrical bearing support 24 is integrally formed at the center portion of the lid member 22. And, a plurality of cooling fins 25 are continuously formed at the outer periphery of the case portion 23, more particularly, at the outer periphery of the lid member 22 in such a manner that the cooling fins 25 are formed like a gear as shown in FIG. 2. The lid member 22, the bearing support 24 and the cooling fins 25 may be integrally made of a material which is excellent in thermal conductivity, for instance, die cast aluminum, with high heat release property. The motor base 21 and the lid member 22 are fixed and form the case portion 23 with three countersunk head screws 26 (see FIG. 2) which are screwed from the exterior side of the motor base 21.

Outer races of two bearings 4, 5 are supported at an interior side of the bearing support 24 at an interval, and a shaft 6 is supported at inner races of the bearings 4, 5. The shaft 6 has a stop ring 7 mounted at a lower end thereof to prevent the shaft from being pulled out and to position the shaft in the axial direction.

Reference numeral 8 denotes an impeller made of synthetic resin, which comprises a cylindrical impeller body 9 and blades 10 provided on an outer periphery thereof. The impeller 8 is mounted on a cup-shaped motor yoke 11 in such a manner as to fit and insert the impeller body 9 to the motor yoke 11.

The motor yoke 11 is connected to a top end of the shaft 6 through a zinc die-cast-made boss 12.

Moreover, the shaft 6 has a connection part provided with knurling grooves 13 so as to improve a tight-fitting with the boss 12. A coil spring 27 is interposed between the inner race of the bearing 4 and the boss 12, thereby forcing the boss 12, namely the impeller 8, in an upward direction in the drawing. Furthermore, a ring-shaped permanent magnet 14 is fixed along an inner periphery of the motor yoke 11.

A stator core 16 having a stator wire 15 wound around is fixed at an outside of the bearing support 24. A circuit board mounting an electronic circuit, e.g. a PC board 17, is mounted below the stator core 16 (at a static part) in order to supply a predetermined electric current to the stator wire 15 to activate a unit of the stator wire 15 on the stator core 16 and a unit of the motor yoke 11 and the permanent magnet 14 as stator and rotor, respectively, for a brush-less direct current motor. The PC board 17 is housed within the case portion 23.

The electronic circuit on the PC board 17 controls an electric current supplying to the stator wire 15 in order to rotate the unit of the motor yoke 11 and the permanent magnet 14 relative to the unit of the stator wire 15 and the stator core 16. The stator wire 15 is connected to the electronic circuit on the PC board 17 by means of a pin terminal 28. In addition, a lead wire 18 is connected to the PC board 17 so as to supply an electric power to the PC board 17 therefrom. Reference numeral 29 in FIG. 1A denotes an insulation interposed between the stator wire 15 and the stator core 16.

The blower thus described is used by mounting at a ventilation hole of a housing (not shown) of OA equipments. In general, the blower is mounted at the ventilation hole in such a manner that the upper side in the drawing faces the exterior of the housing while directing the shaft 6 to be horizontal.

When a direct current of a predetermined voltage is supplied to the lead wire 18, a current controlled by the electronic circuit on the PC board 17 flows to the stator wire 15 through the pin terminal 28. Then a magnetic flux is generated from the stator core 16, which mutually reacts with the magnetic flux generated from the permanent magnet 14 so as to rotate the motor yoke 11 and the impeller 8 at the center of the shaft 6.

As a result, air within the housing at the lower side of the drawing is sucked and releases toward the upper direction of the drawing, namely the outside of the housing through the air cavity 19. The interior of the housing is cooled by this ventilating performance.

The blower according to the present invention has the PC board 17 housed within the case portion 23 as shown FIG. 1A.

Therefore, due to the case portion 23, more particularly, the lid member (partition plate) 22, the blower of the present invention prevents the stator wire 15 from directly contacting with the PC board 17 even if part of the stator wire 15 is unwound toward the side of the PC board 17 over a long time use, thereby prohibiting a short circuit between the stator wire 15 and the PC board 17. Furthermore, the lid member 22 correspondingly insulate a heat generated from the stator wire 15 so that deterioration of the electronic circuit (components 20) on the PC board 17 can be prevented by shutting out a heat directly radiating toward the circuit board 17.

In addition, even if the blower according to the present invention (including housing with mounted blower) is installed in a dusty and/or moisty environment, the PC board 17 is protected with the case portion 23 by prohibiting the dust and moisture from directly settling onto the PC board 17, thereby keeping the electronic circuit (components 20) free from deterioration or short circuit. The electronic circuit (components 20) mounting on the PC board 17 is vulnerable to the dust and/or the moisture causing an extensive reduction of the insulation properties of the circuit; however, such an insulation reduction will be notably improved according to the blower of the present invention.

Furthermore, part of the case portion 23 (lid member 22) is integrally formed with the bearing support 24 for the bearings 4, 5 supporting the shaft 6, and such integrally formed portions (22, 24) are at least made of a material with excellent thermal conductivity, an increase of temperature of the blower due to self-generating heat is minimized. Therefore, deterioration of the electronic circuit (components 20) on the PC board 17 caused by the heat accumulated from an increased temperature of the blower due to self-generating heat is prevented.

Moreover, the blower according to the present invention is provided with the cooling fins 25 disposed on the outer peripheral wall of the case portion 23, thereby significantly depressing an increase of temperature of the blower due to self-generating heat and additionally preventing the deterioration of the electronic circuit (components 20) on the PC board 17.

In the embodiment described above, the cooling fins 25 are integrally formed with the lid member 22 and the bearing support 24 through an aluminum die-cast process so that a heat release effect is remarkably improved. Accordingly, the amount of electric current supplied to the stator wire 15 may be improved to be as a higher rated output resulting in an enhancement of a ventilation capacity and a downsizing of a blower.

Although the above shows the embodiment in which the cooling fins 25 are integrally formed with the lid member 22 and the bearing support 24 of an excellent thermal conductive material (aluminum die-cast), the following embodiment is also applicable that cooling fin rings circularly conjoining the cooling fins 25 are inserted to and fitted at the outer peripheral wall of the lid member 22.

The present invention of the above embodiment is explained for the blower relating to an axial flow type; however, the scope of the invention is not limited thereto, and thus may be applied to a blower of various types.

As described above, the blower according to the present invention enables to prevent deterioration of the electronic circuit (components) mounting on the PC board due to a close disposition of the stator wire relative to the electronic circuit. Also, the blower according to the present invention prevents deterioration of the circuit, particularly the reduction of insulation property, due to installation environment.

Furthermore, the blower according to the present invention enables to largely eliminate an increase of temperature due to self-generated heat and to prevent the electronic circuit (components) mounting on the PC board from being deteriorated due to the accumulated heat. Accordingly, the amount of electric current supplied to the stator wire may be improved to be as a higher rated output resulting in an enhancement of a ventilation capacity and a downsizing of the blower.

Figure 1B:
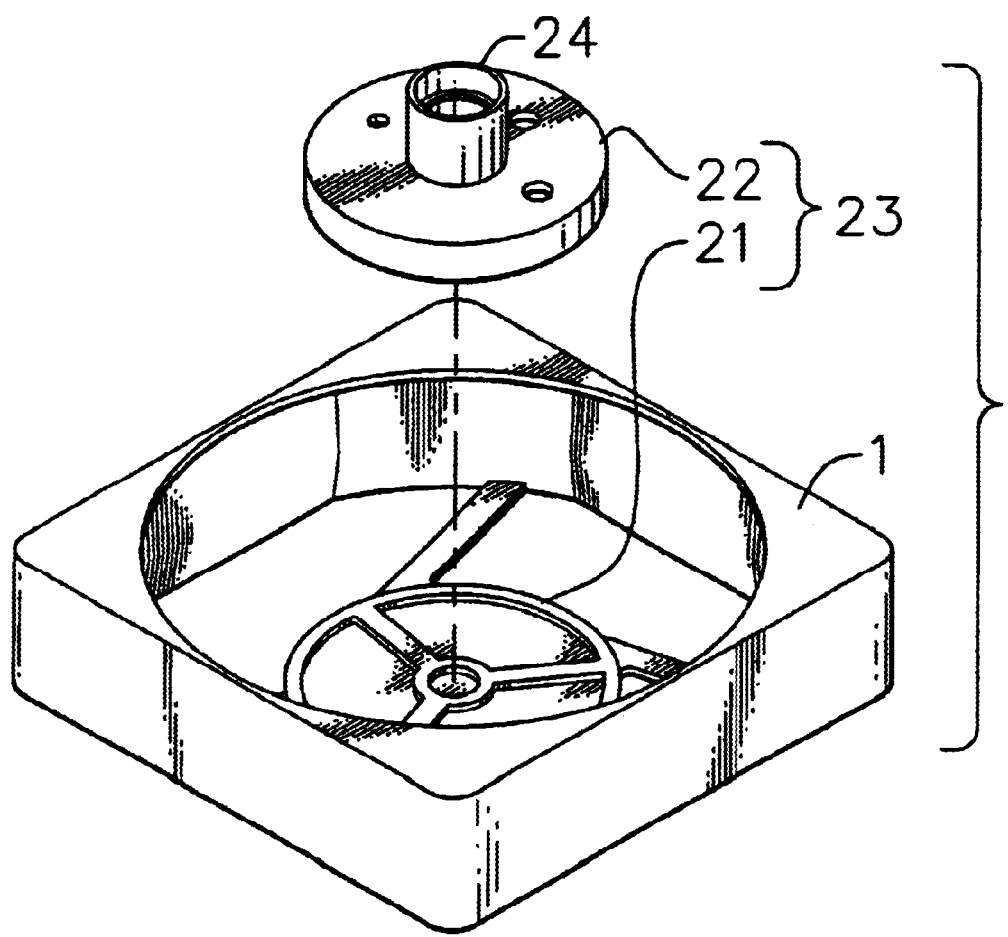
FIG. 1B is a perspective view of certain elements of a blower according to one embodiment of the present invention.

FIG. 1B illustrates the casing 1 and the case portion 23 in a perspective view. As seen in FIG. 1B, the casing 1 has a motor base 21 integrally formed therein. Moreover, the motor base 21 and the lid member 22 (partition plate) collaborate to form the case portion 23. As discussed in the context of FIG. 1A, the case portion 23, and more particularly, the lid member (partition plate) 22, prevents the stator wire 15 from directly contacting the PC board 17. In addition, the case portion 23 prohibits dust and moisture from directly settling into the PC board. Also seen in FIG. 2, is the bearing support 24 integrally formed with the lid member 22. The bearing support 24 provides support for the bearings 4, 5. As previously discussed in the context of FIG. 1A, the lid member 22 and bearing support 24 are made of a material with excellent thermal conductivity, reducing the build up of self-generated heat.

What is claimed is:

1. A blower, comprising:

a bearing disposed at the center of a casing of an approximately cylindrical shape;

a shaft supported by the bearing;

a motor yoke which is mounted on the shaft and has an impeller at an outer periphery thereof and a permanent magnet at an inner periphery thereof;

a stator core having a stator wire wound around and disposed inside of the permanent magnet; and a circuit board mounting an electronic circuit for supplying a predetermined amount of electric current to the stator wire and closely disposed to the stator wire and the stator core, wherein a case portion is closely disposed to said stator wire and said stator core, and said circuit board is housed within said case portion, and wherein said case portion further comprises:

a motor base integrally formed with said casing, and a lid member made of an aluminum die-cast integrally formed with a bearing support member and connected to said motor base in such a manner as to cover said motor base and protect the circuit board.

2. The blower according to claim 1, wherein said case portion is provided with cooling fins disposed at the outer peripheral wall thereof.

* * * * *